United States Patent [19]

Zollinger

[11] 4,103,139
[45] Jul. 25, 1978

[54] WELDING APPARATUS

[75] Inventor: Hans R. Zollinger, Geroldswil, Switzerland

[73] Assignee: H. A. Schlatter AG, Switzerland

[21] Appl. No.: 685,681

[22] Filed: May 12, 1976

Related U.S. Application Data

[62] Division of Ser. No. 514,396, Oct. 15, 1974, Pat. No. 3,982,091.

[51] Int. Cl.² ............................................. B23K 11/02
[52] U.S. Cl. .................................... 219/101; 219/108; 219/161
[58] Field of Search ...................... 219/97, 101, 131 R, 219/108, 158, 161, 100

[56] References Cited

U.S. PATENT DOCUMENTS

| | | | |
|---|---|---|---|
| 2,404,620 | 7/1946 | Cooper | 219/97 |
| 2,413,663 | 12/1946 | Tiedemann | 219/97 |
| 2,727,969 | 12/1955 | Platte | 219/97 |
| 3,036,204 | 5/1962 | Stieglitz et al. | 219/101 |
| 3,665,149 | 5/1972 | Sakabe et al. | 219/131 R |

*Primary Examiner*—Gerald P. Tolin
*Assistant Examiner*—N. D. Herkamp
*Attorney, Agent, or Firm*—Dominik, Knechtel, Godula & Demeur

[57] ABSTRACT

Welding apparatus for welding railroad rails of a construction such that it is movable plus or minus approximately two feet to compensate for the position of the continuous rail, i.e., the already welded together rail sections, as the latter is removed from the welding apparatus. Accordingly, the entire length of the continuous rail need not be moved to properly position it with respect to the welding apparatus to form or make a subsequent weld.

The welding apparatus also is provided with a vertical clamping and aligning system and a horizontal clamping and aligning system, each of which contain pairs of hydraulic cylinders, one of which is larger than the other, with the larger cylinder in each case being operable to a set position with respect to the rail line of the apparatus, to position the rail. The smaller cylinder than operates to effectively clamp the rail against an arm operated by the larger cylinder. Both of the pairs of cylinders are fed from the same source of hydraulic power. With this arrangement, the rails can be more accurately and quickly aligned. In addition, for still greater accuracy, the cylinders are connected in a parallelogram-type arrangement, with the entire arrangement being adjustable by means of still another hydraulic cylinder, for a final alignment adjustment.

The welding apparatus also has lever arms which support the electrodes to vertically clamp the rail which are very rigid in the vertical plane in clamping the rail, but are flexible to some degree in a horizontal plane. This flexibility permits the level arms to be laterally adjustable during the horizontal clamping and aligning process, so that the horizontal and vertical aligning systems are not effectively opposing one another, as in the case of many of the welding apparatus in the prior art.

Still another feature of the welding apparatus is the fact that the deburring or shearing apparatus thereof for shearing off the upset metal surrounding the welding joint can be operated to do so, without removing most of the clamps which support the rail.

6 Claims, 12 Drawing Figures

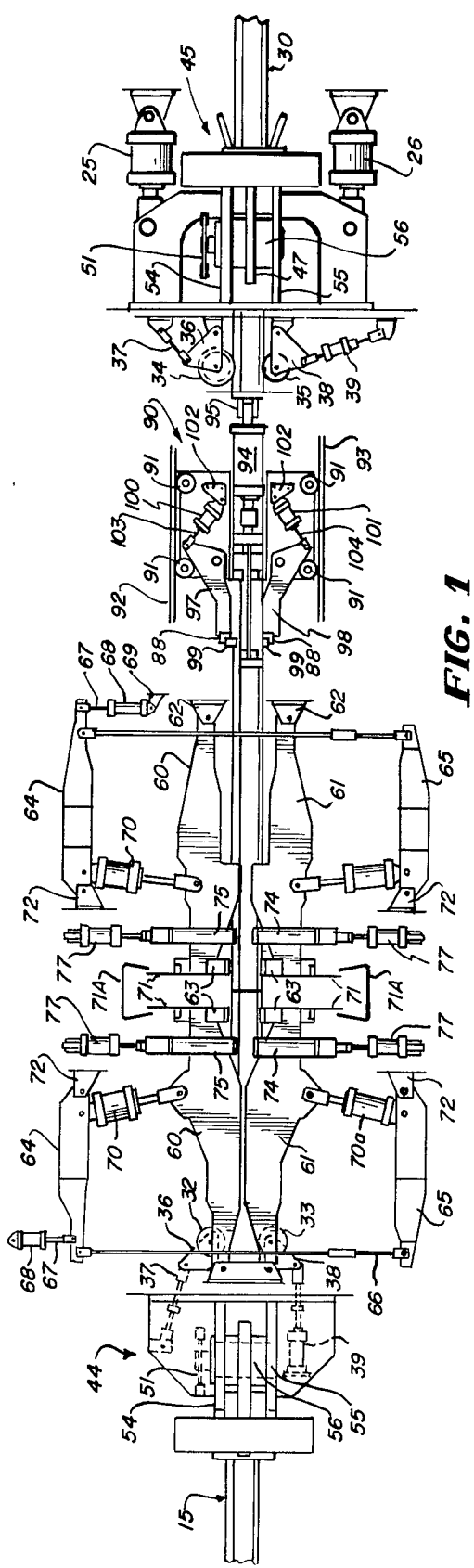
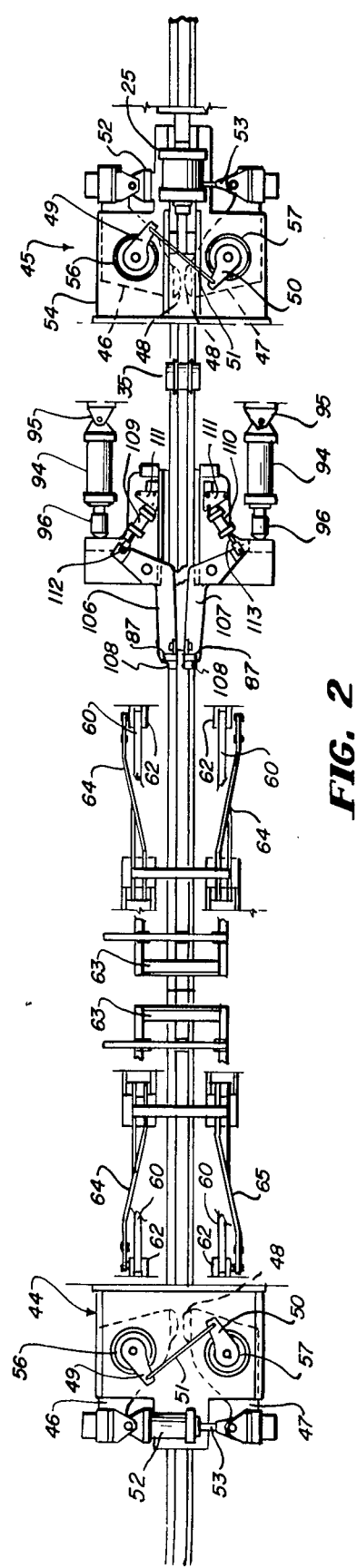
FIG. 1
FIG. 2

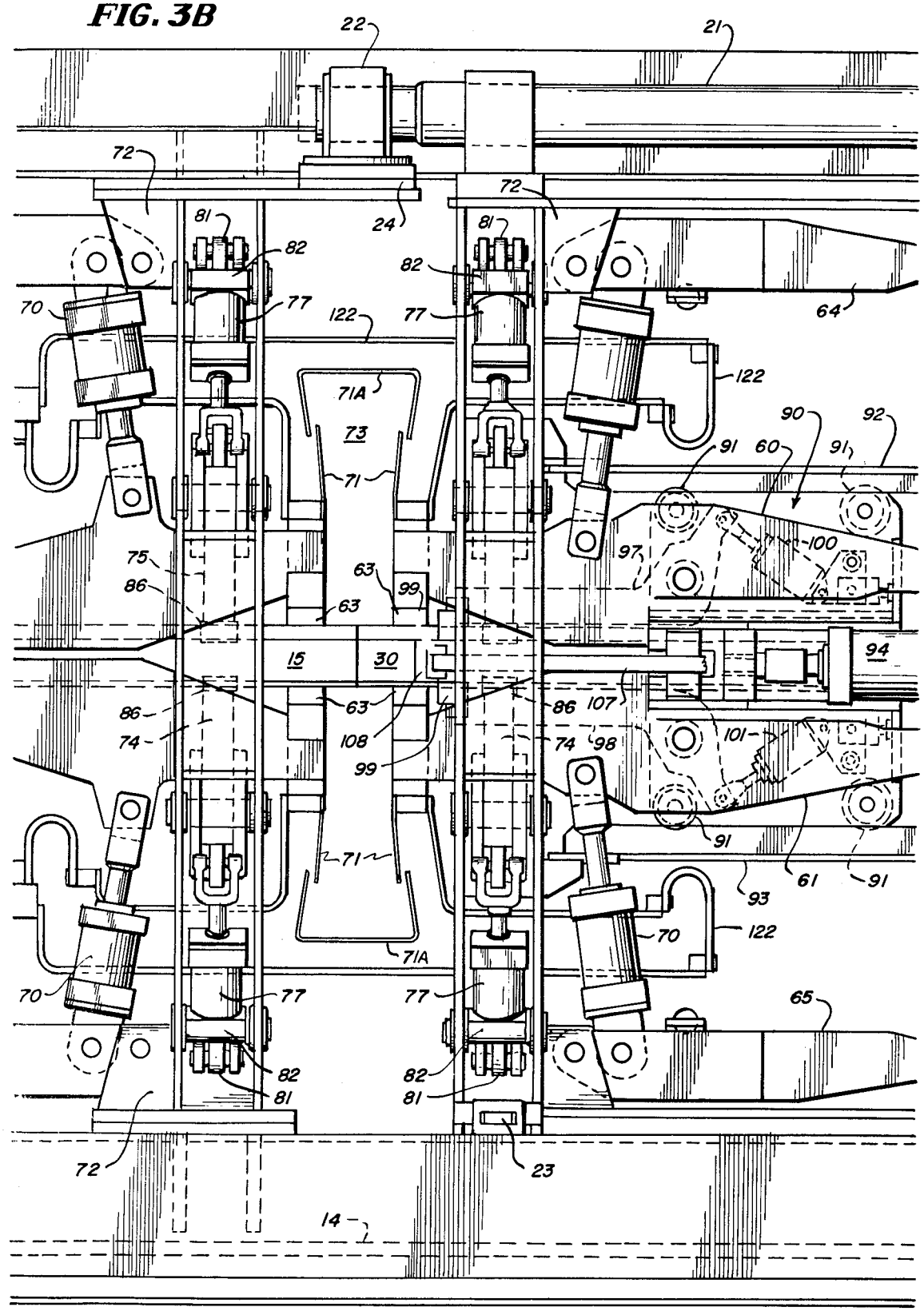

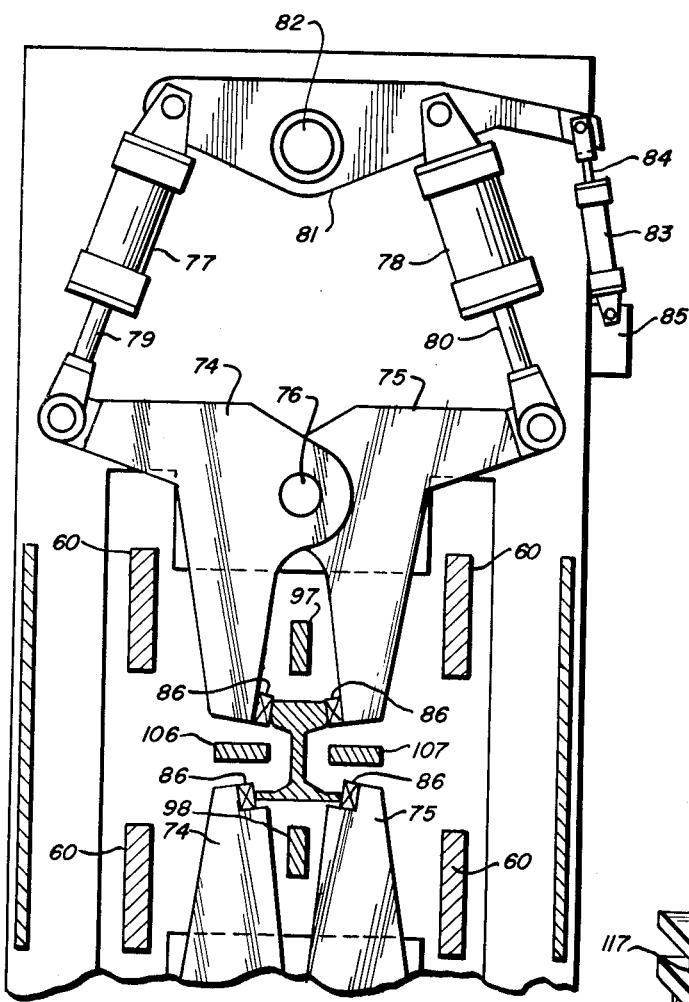

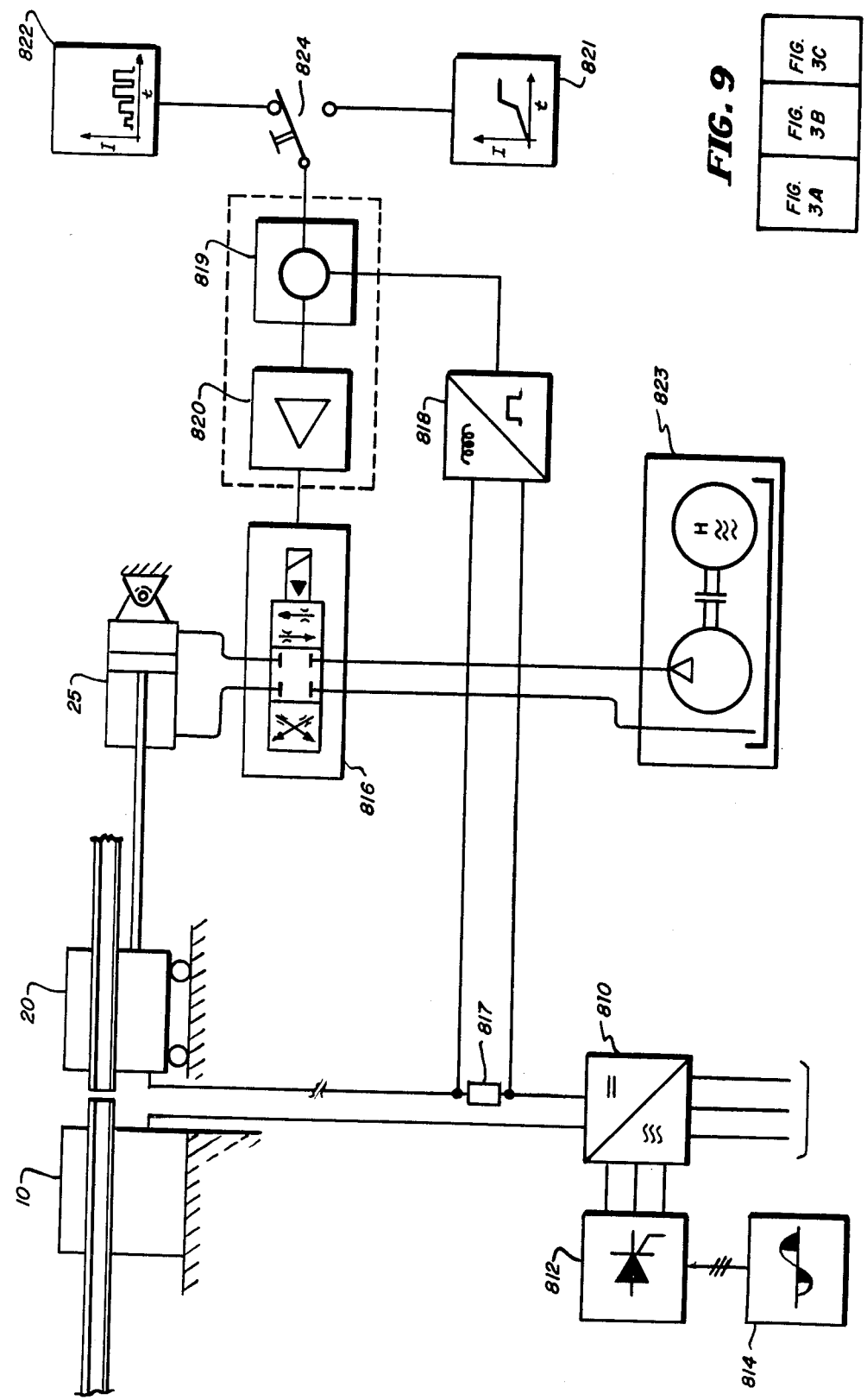

WELDING APPARATUS

Cross Reference to Related Application

This application is a division of application Ser. No. 514,396, filed Oct. 15, 1974, now U.S. Pat. No. 3,982,091.

BACKGROUND OF THE INVENTION

This invention relates, in general, to a new and improved apparatus for forming a continuous rail and, in particular, to a new and improved welding apparatus for welding rail sections together to form a continuous rail.

Welding apparatus for welding together rail sections and other similar materials are generally well-known in the art. Various welding apparatus of this type is disclosed, for example, in U.S. Pat. Nos. 2,781,026; 2,787,698 and 3,134,012. Furthermore, in U.S. Pat. No. 3,030,494, there is disclosed a method and apparatus for forming a continuous rail, using a welding apparatus of the type disclosed in the above-mentioned U.S. Pat. No. 2,781,026.

While the welding apparatus disclosed in these prior patents have been used to weld many rail sections together successfully, they also have been found to be unsatisfactory in that they result in the production of a number of unsatisfactory welds which must be corrected by severing the joint and making a new weld. Obviously, the production of improper welds increases both the time required and the cost of production of the rail.

In addition, in many of these prior welding apparatus, the hydraulic cylinders thereof are closely located to or in the flash-zone. As a result, the flash accumulates on these hydraulic cylinders and ultimately impairs their operation, unless the flash is periodically removed. In many others, the arrangement of the hydraulic cylinders is such that substantial shearing and/or bending stresses are exerted on their piston rods. These stresses likewise tend to impair and, in extreme cases, prevent the operation of the hydraulic cylinders. In still others of them, the action point of the aligning forces are removed from the welding plane, making it difficult if not impossible to satisfactorily weld deformed rails. Also, in many cases, the electrodes are not easily accessible for cleaning, or exchange.

The welding apparatus of the present invention overcomes these above-mentioned shortcomings of the prior welding apparatus and, in addition, provides various other improvements and features. For example, the construction of the welding apparatus is such that it is movable plus or minus approximately two feet to compensate for the position of the continuous rail, i.e., the already welded together rail sections, as the latter is removed from the welding apparatus. Accordingly, the entire length of the continuous rail need not be moved to properly position it with respect to the welding apparatus to form or make a subsequent weld.

The welding apparatus also is provided with a vertical clamping and aligning system and a horizontal clamping and aligning system, each of which contain pairs of hydraulic cylinders, one of which is larger than the other, with the larger cylinder in each case being operable to a set position with respect to the rail line of the apparatus, to position the rail. The smaller cylinder then operates to effectively clamp the rail against an arm operated by the larger cylinder. Both of the pairs of cylinders are fed from the same source of hydraulic power. With this arrangement, the rails can be more accurately and quickly aligned, as described more fully below. In addition, for still greater accuracy, the cylinders are connected in a parallelogram-type arrangement, with the entire arrangement being adjustable by means of still another hydraulic cylinder, for a final alignment adjustment.

Another feature of the welding apparatus is that the lever arms which support the electrodes to vertically clamp the rail are very rigid in the vertical plane in clamping the rail, but are flexible to some degree in a horizontal plane. This flexibility permits the level arms to be laterally adjustable during the horizontal clamping and aligning process, so that the horizontal and vertical aligning systems are not effectively opposing one another, as in the case of many of the welding apparatus in the prior art.

The above described arrangement also eliminates scratching of the rail which may cause the rail to deteriorate.

Still another feature of the welding apparatus is the fact that the deburring or shearing apparatus thereof for shearing off the upset metal surrounding the welded joint can be operated to do so, without removing most of the clamps which support the rail. With prior welding apparatus, all of the clamps had to be removed, before the shearing apparatus could be operated. Since the shearing of the upset metal usually is done while the metal and the welded joint both are still in a semi-molten state, releasing the clamps would permit a deformed rail to move out of alignment and a defective or unsatisfactory joint would result.

Still another important feature of the welding apparatus is the provision of a sensing apparatus for sensing the aligned positions of the rails at the joint and for automatically operating the horizontal and vertical clamping and aligning apparatus to align the rails prior to welding the joint.

Accordingly, it is an object of the present invention to provide improved apparatus for forming a continuous rail.

More particularly, it is an object to provide an improved welding apparatus for welding rail sections together to form a continuous rail.

SUMMARY OF THE INVENTION

The foregoing and other objects and features are provided by a welding apparatus which, in accordance with the invention includes, generally, a frame which is mounted on a rail such that the welding apparatus can be moved relative to the continuous rail, within predetermined limits, to position the continuous rail in the welding apparatus, rather than having to move the continuous rail with respect to the welding apparatus. The continuous rail, after being positioned, is web clamped and then vertically clamped and partly aligned, with a slight crown being automatically formed therein. It is then horizontally clamped and partly aligned. The rail section to be welded to the continuous rail is extended into the welding apparatus and butted against the end of the continuous rail, leaving approximately a ⅛ inch gap. This rail section then is web clamped and then vertically clamped and partly aligned, with a slight crown also being automatically formed in it. It then is horizontally clamped and partly aligned. The sensing apparatus next is positioned, and automatically operates the aligning apparatus to position and align the ends of the rails with respect to one another and to the centerline of the welding apparatus. The rails then are heated for welding, and when proper temperature is attained, the rail section is moved into engagement with the end of the continuous rail to weld the ends thereof together, forming a welded joint. Only the vertical clamping and aligning arms are disengaged, and the shearing apparatus is operated to shear the upset metal about the welded joint, to within approximately 1/16 inch of the rail. After cooling, the horizontal clamping arms and the web clamps are disengaged, and the continuous rail is moved out of the welding apparatus.

BRIEF DESCRIPTION OF THE DRAWINGS

For a fuller understanding of the nature and objects of the invention, reference should be had to the following detailed description taken in connection with the accompanying drawings, in which:

FIG. 1 is a side, diagrammatic, exploded view of the welding apparatus;

FIG. 2 is a top, diagrammatic, exploded view of the welding apparatus;

FIGS. 3a, 3b, and 3c, when assembled as shown in FIG. 9 is a side plan view of the welding apparatus;

FIG. 4 is a view taken transversely through the welding apparatus to illustrate the horizontal clamping arrangement;

FIG. 5 is a view generally like FIG. 4, further illustrating the sensing apparatus;

FIG. 6 is a perspective view of the sensing apparatus;

FIG. 7 is a sectional view through the welding plane, with the electrodes retracted, to illustrate the shearing knives engaged with the rail;

FIG. 8 is a block diagram type schematic generally illustrating hydraulic and electrical apparatus which can be used with the welding apparatus;

FIG. 9 is a view illustrating the manner in which FIGS. 3a, 3b and 3c are assembled.

Similar reference characters refer to similar parts throughout the several views of the drawings.

DESCRIPTION OF THE EMBODIMENT

Figure 3A:
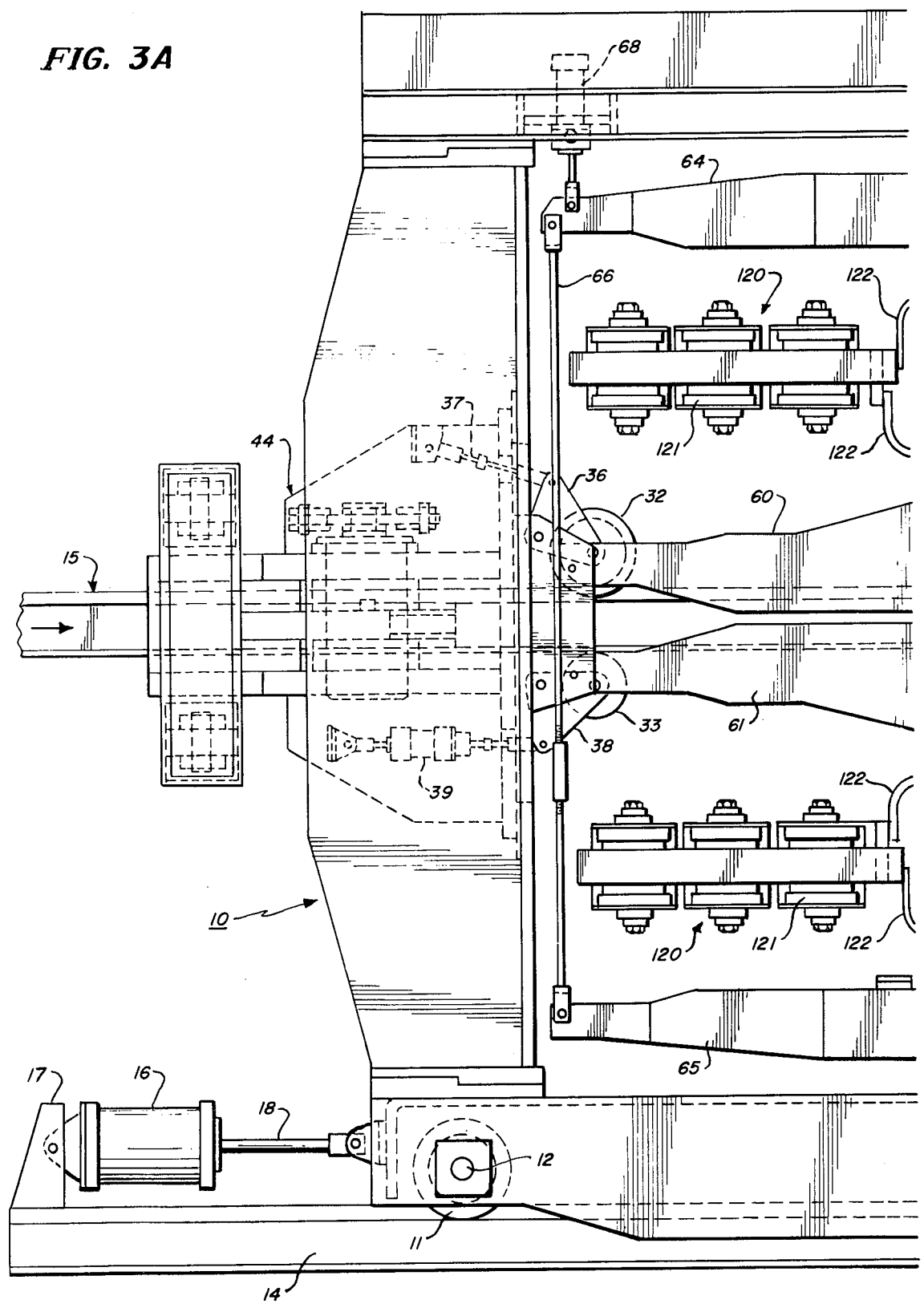
Figure 3C:
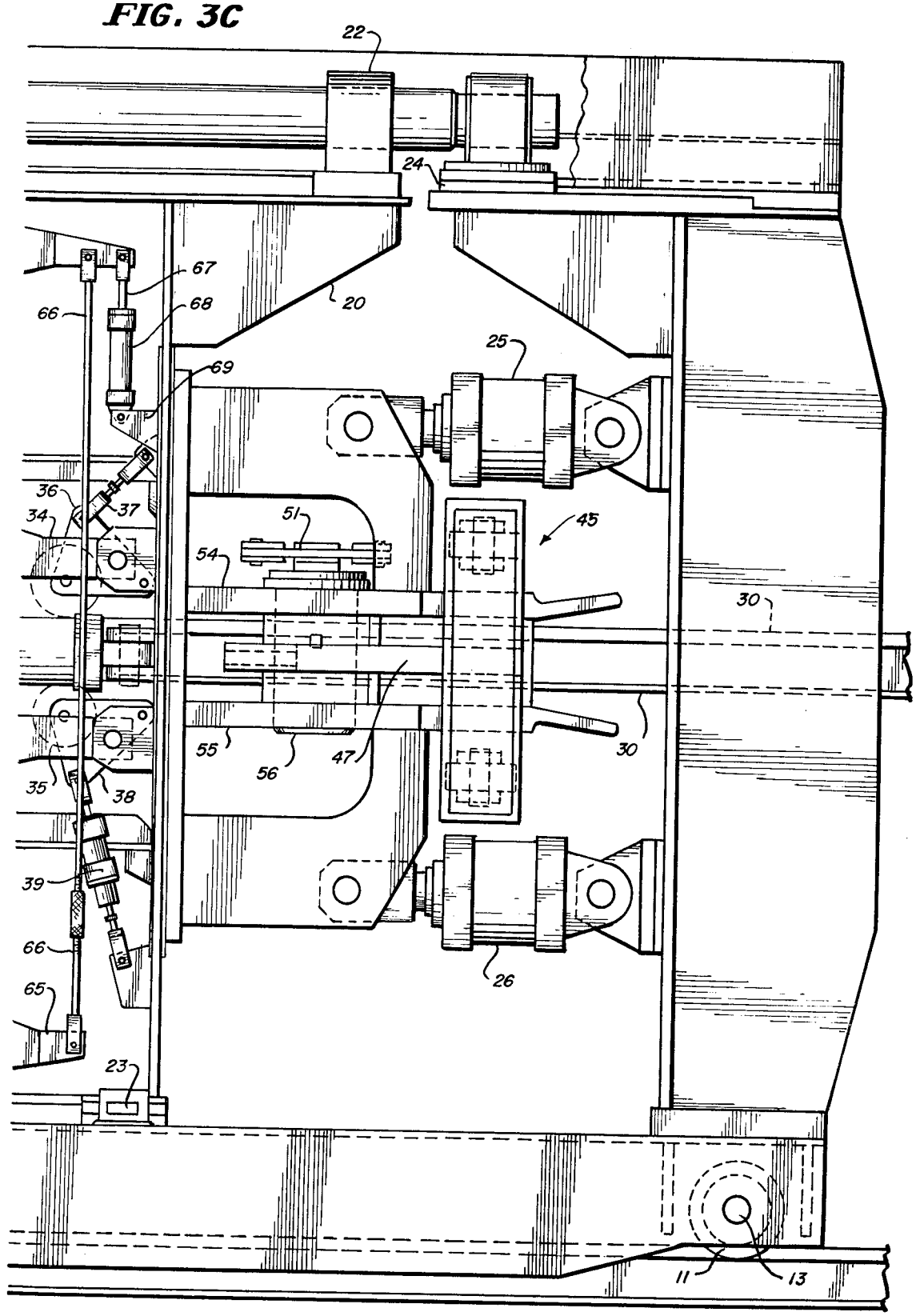

Referring now to the drawings, and in particular, FIGS. 3a, 3b and 3c thereof, the welding apparatus can be seen to include a main, supporting, box-like frame 10 within or upon which the various clamping, aligning, shearing and welding elements are supported, all as more fully described below. The frame 10 has spaced apart axles 12 and 13 to which are rotatably affixed pairs of wheels 11 (only one of which is shown) which ride on rails 14 (only one of which is shown) to permit the welding apparatus to be moved along the length of the rails 14 to position it with respect to a continuous rail 15.

In operation, after welding a joint, the continuous rail 15 is extended out of the welding apparatus, to the left in FIG. 3, to position its end so that a subsequent rail section can be welded to it. In many cases, after being extended out of the welding apparatus, the end is not properly positioned for making the subsequent weld, and in the past, the entire length of continuous rail had to be moved to position its end for welding. By mounting the welding apparatus within the frame 10 and supporting the latter on rails 14, the welding apparatus can be positioned with respect to the end of the continuous rail 15, by moving it forward or backward on the rails 14. In the illustrated embodiment, this movement of the welding apparatus is effected by means of a hydraulic cylinder (or cylinders) 16 which is fixedly secured by means of a brace 17 to the rail 14, with its piston 18 secured to the frame 10. The welding apparatus can be moved in either direction plus or minus approximately 2 feet, by actuating the hydraulic cylinder 16.

The vertical and horizontal clamping and aligning elements of the welding apparatus which are associated with the continuous rail 15 are fixedly secured to the frame 10, all as more fully described below, while the corresponding elements, as well as the shearing apparatus associated with the rail section to be welded to the continuous rail are supported by a carriage frame 20 which is hung from a pair of guide shafts 21 (only one of which is shown) that have their opposite ends secured for longitudinal movement with respect to the frame 10, within journals 22 secured to the latter. The lower end of the carriage frame 20 is freely slidably secured within the frame 10 for longitudinal movement with respect to the latter, with guide rollers 23 preventing lateral movement with respect to the frame 10. The carriage frame 20 and the various elements supported by it are electrically insulated from the frame 10 in a suitable fashion, by, for example, electrical insulation material 24 disposed between the journals 23 and elsewhere. Longitudinal movement of the carriage frame 20 with respect to the frame 10 is effected by means of hydraulic cylinders 25 and 26 which are secured to the frame 10, with their pistons secured to the carriage frame 20. These hydraulic cylinders 25 and 26 are of equal size and are arranged symmetrically above and below the rail section 30 so that asymmetric deformation is minimized as the carriage frame 20 is longitudinally moved during welding, as described more fully below.

Guide Rollers

As can be seen in FIGS. 1 and 3, pairs of guide rollers 32 and 33, and 34 and 35 are provided at the opposite ends of the welding apparatus for guiding the continuous rail 15 and the rail section 30, and for raising the rails into position with respect to the rail line of the welding apparatus. The upper guide rollers 32 and 34 are rotatably supported by pivotally mounted brackets 36, and the latter are pivotally adjustable by a threadable adjustment assembly 37 to position the guide rollers 32 and 34. These guide rollers 32 and 34 are set once with respect to the rail line of the welding apparatus, and need not be repositioned unless necessary due to subsequent misalignment. The lower guide rollers 33 and 35 are similarly supported by pivotal brackets 38, however, hydraulic cylinders 39 are affixed to these brackets 38 and are operable to raise the guide rollers 33 and 35 to engage the base of the rails, to raise and to press the rails against the upper guide rollers 32 and 34, before the rails are clamped.

Web Clamps

In order to avoid slipping of the rails during welding, high clamping forces are required. Since deformation in rail head and base are unacceptable for later installation on the track, the rail-profile is clamped on the web where impressions are not harmful.

Web clamp assemblies 44 and 45 are provided for clamping the web of the continuous rail 15 and the rail section 30, respectively. Each of the web clamp assemblies 44 and 45 as can be best seen in FIG. 2, includes a pair of support arms 46 and 47 which have clamping pads 48 affixed to them for engaging and clamping the rail's web. The support arms 46 and 47 are pivotally and rotatably secured between a pair of spaced-apart supporting plates, by means of a pair of shafts 56 and 57, respectively. Lever arms 49 and 50 are secured to the shafts 56 and 57, respectively, and the ends of these lever arms are coupled together by a link arm 51. The cylinder of a hydraulic cylinder 52 is coupled with the support arm 46, and its piston 53 is coupled with the support arm 47.

In operation, the piston 53 is extended from the cylinder and the action is such that the support arms 46 and 47 pivot on the shafts 56 and 57 to engage the clamping pads 48 against the opposite sides of the rail's web. The link arm 51 connecting the ends of the lever arms 49 and 50 assures that the clamping pads 48 are centered, thus centering the rails in the welding apparatus.

Vertical Clamping

The vertical clamping assembly and the electrodes 63 are integrated in one single system. Since vertical clamping is required only for alignment, the applied forces can be moderate and proper current-contact is obtained without harmful deformation to the electrodes 63.

The vertical clamping assembly for the continuous rail 15 and the rail section 30 are the same, however, one is supported by the frame 10 and the other by the carriage frame 20. Each assembly includes two upper lever arms 60 and two lower lever arms 61, with the arms of each pair being spaced on opposite sides of the rails, as can be best seen in FIG. 2. These lever arms 60 and 61 are of flexible spring steel and are of relatively long length and substantial width, and one end of each of the lever arms 60 and 61 is pivotally secured by means of brackets 62 secured to the frame 10, or 20. This arrangement permits the lever arms 60 and 61 to be laterally adjustably positioned, within limits, without placing undue stress on them, during horizontal alignment of the rails, as more particularly described below. An electrode 63 is affixed to each pair of lever arms 60 and 61 to span across the top and the bottom of the rails. Another pair of lever arms 64 and 65 are associated with each of the pairs of lever arms 60 and 61. These lever arms 64 and 65 are pivotally secured at their one end to the frame 10, or 20, by means of brackets 72, and the other ends thereof are coupled together by link arms 66. These lever arms 64 and 65, and the lever arms 60 and 61, are offset to a cetain degree to allow the installation of the link arms 66. The ends of the lever arms 64 each have the piston 67 of a hydraulic cylinder 68 affixed to them. The hydraulic cylinders 68 are securely fixed to the frame 10, or 20, by means of spherical bearings to allow movement in two axes so that undue stresses during alignment are avoided. The hydraulic cylinders 70A are of a smaller diameter than the hydraulic cylinders 70, to permit the position of the upper electrodes to be preset, as more fully described below. A flash shield 71 is affixed to the ends of the lever arms 60 and 61, and together with the flash guards 71A which are affixed to the frame 10, form a flash cavity 73 within which the majority of the resulting flash can be contained.

In operation, the hydraulic cylinders 70 affixed to the upper lever arms 60 are operated first to vertically clamp the rail 15, or 30. The lever arms 60 are pivotally moved to a set point with respect to the rail line of the welding apparatus. The hydraulic cylinders 39 are next operated to raise the guide rollers 33 and 35 to engage and to physically lift the rails 15 and 30, into engagement with the guide rollers 32 and 34. The smaller diameter hydraulic cylinders 70A affixed to the lower lever arms 61 now are operated to engage the electrodes 63 affixed to them with the rail 15, or 30, to physically lift the rail to form a slight crown of approximately 1/16 to 1/32 of an inch in the rail, and to press the rail against the electrodes affixed to the upper lever arms 60. The vertical alignment of the rails can be further adjusted by operating the hydraulic cylinders 68 affixed to the lever arms 64, as more fully described below.

It may be noted that the above-described arrangement of the vertical clamping arms provides several improvements and advantages over prior welding apparatus. For example, all of the hydraulic cylinders are placed out of the flash zone, so that the flash does not fall on them. By pivotally affixing the hydraulic cylinders, all shear and bending stresses on the pistons thereof are eliminated. The action point of the aligning forces, i.e., the electrodes 63, are very close to the welding plane, thus permitting deformed rails to be more easily welded. The electrodes 63 also are easily accessible for cleaning and exchange. And, as indicated above, the lever arms 60 and 61 while very rigid in the vertical plane are laterally movable in the horizontal plane, within limits. Accordingly, during horizontal alignment, undue stress is not placed on the lever arms 60 and 61, as in the case of the stresses placed on the pistons of the vertical clamping hydraulic cylinders used in prior apparatus. Also, since the lever arms 60 and 61 are flexible, the electrodes 63 do not scratch the rails as a result of lateral movement with respect to them, during horizontal alignment.

Horizontal Clamping

In addition to the web clamping assembly described above, another horizontal clamping assembly for clamping the ends of the rails and for securing them against lateral movement is provided. In this case, the head and the base of the rail are held, for properly aligning the rail. Also, in addition to horizontally aligning the ends of the rails, twist corrections are possible with the same arrangement. The arrangement further permits the upset metal to be sheared by the shearing apparatus, while the rail is clamped.

A horizontal clamping assembly is associated with the frame 10 and the carriage frame 20, and functions to clamp and to align the continuous rail 15 and the rail section 30, respectively. As can be best seen in FIGS. 3 and 4, each of the horizontal clamping assemblies includes a pair of upper lever arms 74 and 75 which are pivotally affixed to a pivot shaft 76 which is aligned with and above the longitudinal rail line of the welding apparatus. Another lever arm 81 is pivotally affixed to a pivot shaft 82 which is positioned above and in alignment with the pivot shaft 76. Hydraulic cylinders 77 and 78 are pivotally affixed to the lever arm 81, to pivot points equally spaced on the opposite sides of the pivot shaft 82, and the pistons 79 and 80 of these hydraulic cylinders 77 and 78 are pivotally affixed to the lever arms 74 and 75, respectively, to form a parallelogram type arrangement. With the lever arm 81 fixedly positioned, operation of the hydraulic cylinders 77 and 78 operate the lever arms 74 and 75 in a scissor-like action to clamp the head of the rail, as illustrated in FIG. 4.

The ends of the lever arms 74 and 75, at the clamp point engagement with the rail, have jaws 86 of a hardened material provided on them and positioned under a certain angle, as illustrated in FIG. 4. The result of this design is that, in addition to the horizontal clamping force, the induced vertical component holds the rail in position even though the electrodes used for vertical clamping are retracted during shearing.

A hydraulic cylinder 83 is pivotally secured to a bracket 85 secured to the frame 10, or 20 and its piston 84 is pivotally secured to one end of the lever arm 81. This hydraulic cylinder 83 is operable to pivotally rotate the lever arm 81 about the pivot shaft 82, which action can be seen to laterally position the lever arms 74 and 75 and hence the rail clamped between the ends thereof.

A corresponding arrangement is positioned beneath the rail for clamping the base of the rail, with only a portion of the lever arms 74 and 75 being illustrated since the construction and operation is the same as described above.

With this arrangement, it may be noted that the hydraulic cylinders 77, 78 and 83 all are placed well away from the flash zone. The horizontal clamping assemblies for the continuous rail 15 and the rail section 30 are in spaced-apart relationship, a short distance back from the welding plane, behind the electrodes 63, as can be best seen in FIG. 3.

It may be further noted that by independently operating the hydraulic cylinders 83 associated with the upper and lower lever arms 81, that the upper and lower sets of lever ams 74 and 75 can be manipulated to effectively twist the ends of the rails, to thereby permit twist corrections to be made on deformed rails. During alignment, a low hydraulic pressure advantageously can be applied to the hydraulic cylinders 77 and 78, to permit slight relative movement between the rails and the lever arms 74 and 75. Full hydraulic pressure is applied during welding and shearing so that the rail ends remain in set position.

Shearing Apparatus

The shearing apparatus is positioned within the welding apparatus and supported for longitudinal movement on the carriage frame 20 such that the upset metal can be sheared while the full upsetting force is maintained, and while the clamping forces exerted by the web clamp assemblies and the horizontal clamping assemblies both are maintained. Only the electrodes 63 has to be lifted from the rails. Shearing on the rail profile is made successively, so that the shearing force required is reduced.

The shearing apparatus, as can be best seen in FIGS. 1 and 2, includes a box-like housing 90 through which the rail section 30 is extended, and this housing 90 has four guide wheels 91 rotatably affixed to it which ride in or on spaced-apart rails 92 and 93 secured to the carriage frame 20, to permit longitudinal movement of the shearing apparatus with respect to the carriage frame, along the length of the rail section. The shearing apparatus is advanced and retracted by means of a pair of hydraulic cylinders 94 which are pivotally secured to brackets 95 secured to the carriage frame 20, with their pistons 96 pivotally secured to the housing 90. The hydraulic cylinders 94 are symmetrically arranged on opposite sides of the rail section 30, as can be seen in FIG. 2.

A pair of lever arms 97 and 98 (FIG. 1) are pivotally affixed to the housing 90 above and below the rail section, and carry brass shoes 88 which ride on the rail, as more particularly described below, and shearing knives 99 (FIGS. 1 and 7) on the ends thereof having cutting edges which are formed to substantially correspond with the profile of the head and base of the rail to be sheared, respectively. These lever arms 97 and 98 are pivotally moved into shearing engagement with the rail by means of hydraulic cylinders 100 and 101 which are pivotally affixed to brackets 102 secured to the housing 90 and which have their pistons 103 and 104 pivotally secured to respective ones of the lever arms 97 and 98.

Another pair of lever arms 106 and 107 (FIG. 2) are pivotally affixed to the housing 90 on opposite sides of the rail section 30. These lever arms 106 and 107 carry brass shoes 87 which ride on the rail and shearing knives 108 (FIGS. 2 and 7) on the ends thereof which have cutting edges substantially corresponding to the profile of the web of the rail section. Hydraulic cylinders 109 and 110 are pivotally secured to brackets 111 secured to the housing 90 and have their pistons 112 and 113 affixed to the respective lever arms 106 and 107 for moving them into shearing engagement with the web of the rail section.

In the illustrated embodiment, the lengths of the lever arms 106 and 107 are longer than the lengths of the lever arms 97 and 98 so that the shearing knives 108 thereon are located forward of the shearing knives 99. Accordingly, when the housing 90 is longitudinally advanced, the upset metal at the web is sheared before the upset metal of the head and base of the rail. With this arrangement, the required shearing force is reduced. These shearing knives 99 and 108 may be generally of the type disclosed in U.S. Pat. Nos. 3,030,494 and 3,081,673, however, they are connected with the lever arms 94, 95, 106 and 107 instead of to a box-like frame.

As can be best seen in FIGS. 3 and 4, the shearing apparatus is positioned with respect to the lever arms 74 and 75 of the horizontal clamping assembly supported by the carriage frame 20 such that its lever arms 97, 98, 106 and 107 extended between the lever arms 74 and 75, and the shearing knives on the ends thereof are positioned on the side of these lever arms closest to the weld joint. Accordingly, with this arrangement, the shearing apparatus can be operated without releasing the horizontal clamping forces.

In operation, the vertical clamping forces are released and the electrodes 63 moved out of position so as not to interfere with the shearing knives 99 and 108. The hydraulic cylinders 100, 101, 109 and 110 then are operated to slidably engage the brass shoes 88 and 87 with the respective surfaces of the rails to position the shearing knives 99 and 108 into shearing engagement with the rail, to shear the upset metal to within approximately 1/16 of an inch of the rail, as can be best seen in FIG. 7. The brass shoes 88 and 87 permit the shearing knives 99 and 108 to follow the profile of the rail, so as to compensate for slight differences which may exist in the profile thereof, from one rail section to another. The hydraulic cylinders 94 next are operated to longitudinally advance the housing 90 and hence the lever arms 97, 98, 106 and 107 with the shearing knives on them, to shear off the upset metal, and then retract. It can therefore be seen that the upset metal can be sheared while the full upsetting force is maintained and with only the vertical clamping force removed.

Automatic Alignment

As can be best seen in FIGS. 5 and 6, a pivot arm 115 is pivotally secured at its one end to a bracket 116 secured to the frame 10, to be pivoted into position adjacent the ends of the continuous rail 15 and the rail section 30. This pivot arm 115 carries two sets of three sensors 117, 118 and 119 which are fixedly positioned with respect to the rail line of the welding apparatus, to position the top, the side of the head and the side of the base of the rails, respectively. These sensors 117-119 may be electric, magnetic or photoelectric sensors capable of detecting the location of the rail with respect to them, and they are coupled to control apparatus (not shown) which automatically controls the operation of the hydraulic system feeding the hydraulic cylinders 68 and 83 of the vertical and horizontal clamping arrangements.

After the rails have been vertically and horizontally clamped, the pivot arm 115 is pivoted into position adjacent the ends of the rails, between the lever arms 74 and 75 of the two horizontal clamping arrangements, and the control apparatus associated with the sensors 117 and 119 is energized. The control apparatus functions to supply hydraulic fluid to the hydraulic cylinders 68 to operate the lever arms 60 and 61, via the link arms 66, to vertically adjust the position of the ends of the rails until the sensors 117 detect that the ends are properly vertically positioned with respect to the sensors 117 and hence the rail line of the welding apparatus. At that time, the sensors 117 operate the control apparatus to cut off the supply of hydraulic fluid, to hold the ends of the rails in this fixed vertically adjusted position.

Correspondingly, the hydraulic cylinders 83 are operated to pivotally adjust the lever arms 81 to, in turn, pivotally adjust the lever arms 74 and 75 to laterally and horizontally align or position the heads of the rails with respect to the sensors 118. At that time, these sensors 118 operate the control apparatus to cut off the supply of hydraulic fluid, to hold the ends of the rails in fixed horizontally adjusted positions.

It may be noted that by independently operating the hydraulic cylinders 83 associated with the upper and lower lever arms 81, that the head and the base of the rail can be twisted with respect to one another, so as to provide twist corrections to the rails. With this arrangement, deformed rails can be more easily and accurately aligned for welding. Also, in aligning the ends of the rails, the top and the side edges of the head and base of the rails which are contacted by the wheels of a railroad car or locomotive are precisely aligned, thus the initial and important portions of the rails are always aligned, regardless of the alignment of the remaining edges of the rails. Prior to welding the rail ends, the pivot arm 115 is pivotally positioned out of the flash zone.

Electrical Apparatus

Two groups of transformers 120, with three transformers in each group and with each transformer having a rectifier 121 associated with it, are mounted on the frame 10 so as to be easily accessible for servicing. Conductor bars 122 couple the rectifiers 121 and the electrodes 63. Since the rectifiers 121 deliver direct current, no inductive losses will occur in the conductor bars 122. Power consumption thereof is reduced, and a symmetric load on the three phase power source (not shown) for the transformers is provided.

In operation, approximately 200-650 kilovolt-amperes (KVA) of power are provided by the transformers to heat the ends of the rails for welding them as more particularly described below.

Welding Cycle

The welding apparatus of the present invention can be incorporated into a system including apparatus of the type disclosed in the above-mentioned U.S. Pat. No. 3,030,494, or used in conjunction with the other types of apparatus for preparing the rail sections for welding and for transporting the rail sections to the welding apparatus. Other apparatus is provided or used in conjunction therewith for handling and transporting the continuous rail.

Generally, the individual rail sections to be welded together are lifted one at a time onto power driven rollers which feed the rails to the welding apparatus. As the rail section advances along the power driven rollers, accumulated scale from the running surface and the base of the rail section near its opposed ends is removed. This can be accomplished by hand using a hand-held power grinder or a belt type spot grinder which is automatically operated as the ends of the rail sections pass through the grinder.

The continuous rail 15 extends to the left, out of the welding apparatus, as illustrated, and the rail section to be welded to it enters the welding apparatus from the right. At the completion of the welding and shearing operation, the continuous rail 15 including the added rail section is moved through the welding apparatus, by suitable means such as pusher mechanism of the type disclosed in U.S. Pat. No. 3,030,494. The excess metal left after shearing the upset metal is ground off of the rail, by means of a grinding apparatus, which also may be automatically operated by means of a weld sensing mechanism. Thereafter, the continuous rail is pushed past a testing station whereat the weld is carefully checked to make certain that it is satisfactory.

Rails up to one quarter of a mile in length are formed by joining rail sections together. As these rail sections are joined, the end of the already welded sections, i.e., the end of the continuous rail, must be properly located in the welding apparatus to ready it for the next weld. It can be appreciated that moving and controlling the position of the continuous rail is not an easy task, in view of its length. It therefore is sometimes difficult to properly position the end of the continuous rail in the welding apparatus in preparation for the next weld.

In accordance with the present invention, this positioning of the end of the continuous rail is far more easily accomplished by mounting the welding apparatus on the rails 14, for longitudinal movement with respect to the continuous rail 15. This movement is effected by operating the hydraulic cylinder 16. During this longitudinal movement, the continuous rail 15 rolls on the guide roller 33.

When this continuous rail 15 is properly positioned, the hydraulic cylinder 52 is actuated to web-clamp the rail, in the manner described above.

When the continuous rail 15 has been web clamped, the upper one of the hydraulic cylinders 70 is actuated to pivotally operate the lever arms 60 to engage the upper electrode 63 with the rail, to push the rail down to set point with respect to the rail line of the welding apparatus. At this time, the piston 67 of the hydraulic cylinder 68 is fully retracted.

The hydraulic cylinder 39 next is actuated, and the guide roller 33 physically lifts the rail into engagement with the guide roller 32. The latter is set once to a set position with respect to the rail line or rolling line of the welding apparatus, and need not be repositioned unless necessary.

The lower hydraulic cylinder 70A now is actuated to pivotally operate the lever arms 61 to engage the lower electrode 63 with the rail, to physically lift the rail against the upper electrode. A slight crown of approximately 1/16 to 1/32 of an inch is formed in the rail during this operation.

The rail section 30 is fed into the welding apparatus, and as it enters it, rolls on the guide roller 35. The end of the rail section 30 is butted against the end of the continuous rail 15, leaving approximately ⅛ inch gap between them.

The rail section 30 then is web clamped, and vertically clamped, in the manner described above, by the web clamp assembly and the vertical clamping assembly associated with this rail section and supported by the carriage frame 20. A slight crown of approximately 1/16 to 1/32 of an inch also is formed in this rail section, during the vertical clamping operation.

The continuous rail 15 and the rail section 30 each now are horizontally aligned by means of the horizontal clamping assemblies associated with the respective ones of them. With reference to FIG. 4, the piston 84 of the hydraulic cylinder 83 is fully retracted at this time, and the hydraulic cylinder 78 which is larger than the hydraulic cylinder 77 is first actuated to pivotally operate the lever arm 75 to a set position to horizontally align the rail with respect to the centerline of the welding apparatus. The hydraulic cylinder 77 then is actuated to pivotally operate the lever arm 74 to engage and to push the rail against the lever arm 75 to clamp the rail between them.

When the ends of the two rails have been clamped in the above-described manner, the pivot arm 115 is pivoted into position with respect to the rails. The control apparatus (not shown) associated therewith is activated, and functions to actuate the hydraulic cylinders 68 and 83 to vertically and horizontally align the ends of the rails with respect to the sensors 117–119. It may be noted that the hydraulic cylinders 83 associated with the upper and lower sets of lever arms 74 and 75 are or can be independently operated to provide twist correction. In this fashion, the ends of the two rails are exactly positioned with respect to one another, for welding.

The rails are now heated for welding, by passing current from the electrodes 63 through the ends to be joined. Current flow is provided by the transformers 120 and their associated rectifiers 121, with the same being supplied by a source of power (not shown). During heating, the rail section 30 is moved back and forth to flash the ends until they are heated, and then the end of the rail section 30 is forced against the end of the continuous rail 15 to complete the weld. This movement of the rail section 30 is effected by means of the hydraulic cylinders 25 and 26.

When the end of the rail section is forced against the end of the continuous rail, an upset of metal is pushed out around the joint and, hence, as soon as the welding operation is completed, the shearing apparatus is actuated to remove the major portion of the upset metal.

As indicated above, only the electrodes 63 and hence the vertical clamping forces must be moved out of the way in order to actuate the shearing apparatus, while the horizontal clamping and aligning forces are maintained. The rails therefore are fixedly held during the shearing operation, and there is less likelihood of an unsatisfactory joint being formed as a result of all of the clamping forces being removed before the weld cools, as in the past.

The hydraulic cylinders 100, 101, 109 and 110 all are actuated to pivotally operate the lever arms to which they are affixed to engage the shearing knives on the ends of the lever arms with the rails. The shearing assembly is longitudinally advanced by actuating the hydraulic cylinders 94. As indicated above, the shearing knives are staggered so that shearing occurs successively at the different locations on the rail, and the required shearing force is therefore reduced. The lever arms supporting the shearing knives also carry bronze shoes which are forced into engagement with the surface of the rail, so that the shearing knives shear the upset metal to within approximately 1/16 of the rail. This arrangement also permits the shearing knives to follow the profile of the rail so that slight differences in profile are compensated for.

After shearing the upset metal, the horizontal clamps are released, and the continuous rail is pushed out of the welding apparatus, generally as described above, in ready for the next welding operation.

Hydraulic and/or Electrical Circuitry

The hydraulic and electrical circuitry employed with the illustrated welding apparatus may be of the type conventionally used with similar welding apparatus, such as those disclosed in the above-mentioned U.S. patents. Furthermore, the hydraulic and electrical circuitry may differ depending upon the mode of operation desired, that is, manual, semiautomatic or automatic operation. Accordingly, to this extent, this circuitry forms no part of the present invention, for having the advantage of the description of the construction and operation of the welding apparatus, it would be well within the ability of one skilled in the art to provide this circuitry.

The performance of the welding apparatus, as far as rated power, power consumption, welding time and quality of the welded joint, can be improved by using a new combination of components, described more fully below and generally illustrated in FIG. 8.

Figure 10:
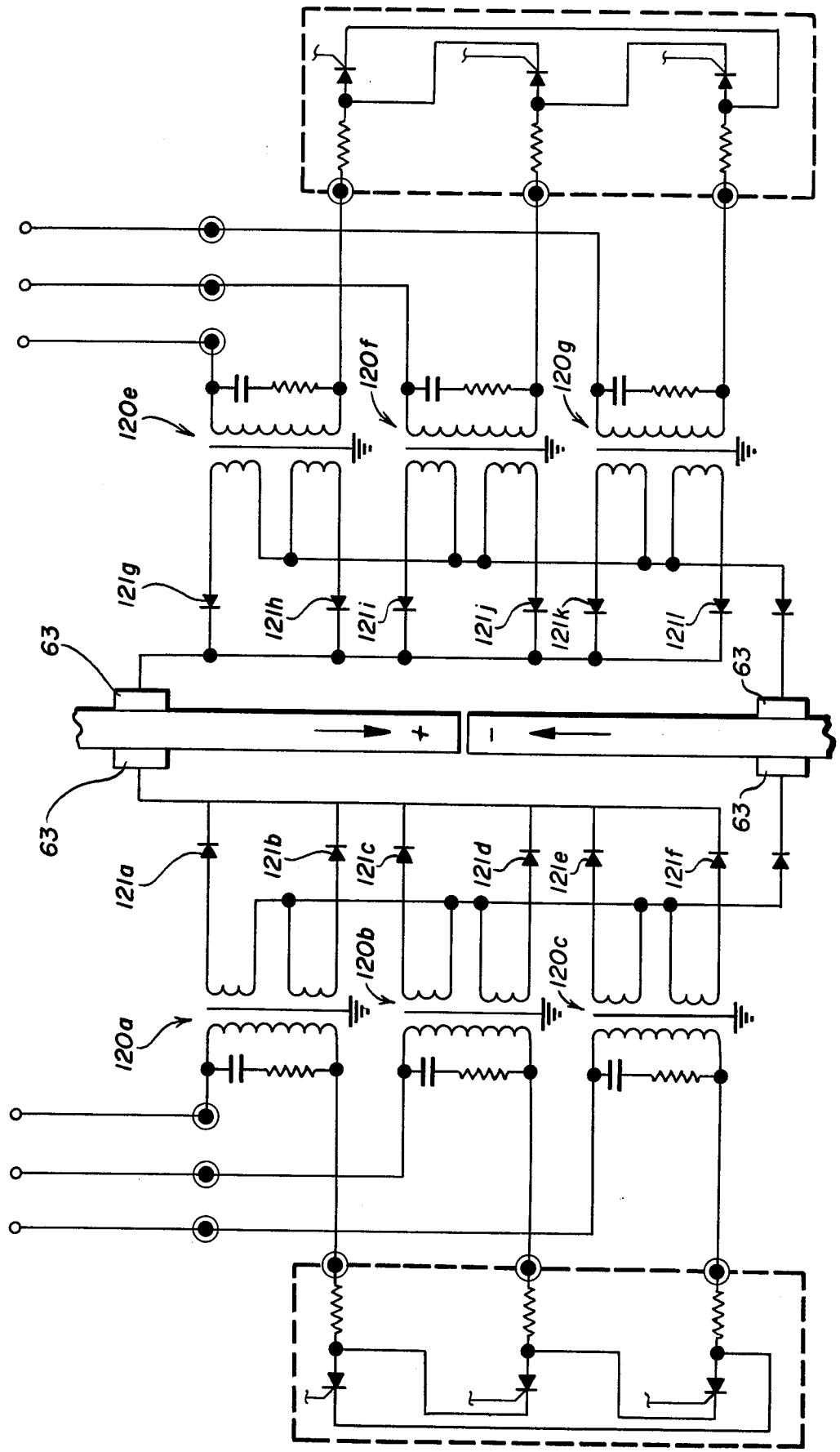
FIG. 10 is an electrical circuit diagram illustrating the manner in which the welding current is delivered to the electrodes.

In particular, the welding current is delivered by a rectifier group 810 (FIG. 8) including the rectifiers 121-a to 121-1 and transformers 120a-120c and 120e-120g (FIGS. 3a and 10). The use of three monophase transformers 120a-120c and 120e-120g, with separate cores and two secondary windings, permits a six phase rectifying of the welding current. With this arrangement, overlapping of the primary phase currents is possible, without an additional interphase transformer generally required in such cases. Compared with a regular alternating current supply, this design allows a smoother flash operation, since the welding current never goes back to zero and voltage peaks induced by these strong current fluctuations are avoided. Therefore, the required heat can be introduced in a shorter time without overheating the contact area. On the other hand, the supply line receives a more evenly distributed load since, by six phase rectifying, the required rated power, at the same voltage drop, is only 40% of the value needed for a single phase welding apparatus.

The transformer groups are energized at the star point of the primaries of the three transformers by three thyristors 812 (FIG. 8) in a delta-connection. The various voltage levels for preheating, flashing, butting and postheating, as well as the on and off signals, are induced at the gates of the thyristors 812 by a phase control 814.

Also, conventional welder controls use a time dependent platen travel which reverses after reaching a certain current value, and advance again after complete interruption of the flashing current. In accordance with the present invention, the welding apparatus is provided with a continuously operating advance control valve 816, instead of the normally used time dependent platen movement. The movement of the platen or carriage frame 20 is varied as a function of the welding current which is measured by a probe 817 (i.e., a shunt) to provide a control signal to a signal converter 818 which, in turn, provides a corresponding DC output pulse to a comparator 819. The comparator 819 compares this control signal with preset time-current-function signals from a reference input generator 821 for continuous flashing, and the difference signal is amplified by an amplifier 820 and coupled to the control valve 816 to control its operation. The control valve 816 controls the supply of hydraulic fluid from a hydraulic pump 823 to the hydraulic cylinders 25 and 26 (FIG. 3c), only one of which is shown in FIG. 8, which advance and retract the carriage frame 20.

Alternatively, if the required value of the control signal to the control valve 816 need be varied with supplementary superimposed pulses, a signal generator 822 which provides a combination of low frequency pulses (i.e. 2-10Hz) superimposed with a time-current curve for pulsed flashing can be provided. The switch 824 is provided for coupling either the signal generator 821 or 822 to the comparator 819.

It will thus be seen that the objects set forth above, among those made apparent from the preceding description, are efficiently attained and certain changes may be made in the above construction. Accordingly, it is intended that all matter contained in the above description or shown in the accompanying drawings, shall be interpreted as illustrative and not in a limiting sense.

Now that the invention has been described, what is claimed as new and desired to be secured by Letters Patent is:

1. Welding apparatus for welding rail sections together in end to end relationship to form a continuous rail comprising, in combination: a pair of vertical clamping assemblies for vertically clamping and aligning the respective ones of a pair of rail sections to be welded together to form a continuous rail, said vertical clamping assemblies including electrodes engageable with adjacent ends of a pair of rail sections to be welded together; means for causing current flow between said electrodes and through the ends of said rail sections in order to make a weld; a pair of horizontal clamping assemblies for horizontally clamping and aligning the respective ones of said pair of rail sections; said pair of vertical clamping assemblies each comprising a pair of upper and a pair of lower level arms, the lever arms of each pair being spaced on opposite sides of a rail section and being pivotally affixed for rotation in a vertical plane at one end thereof, the opposite ends of the lever arms of each pair having one of said electrodes connected between them so that each of said electrodes engages one of the upper and lower surfaces of said rail section when the respective pairs of said lever arms are pivotally rotated, said upper and lower pairs of lever arms being rigid in the vertical plane thereof and being flexible within limits in a horizontal plane, whereby no undue stress is placed on said lever arms during horizontal alignment of said rail sections, and means for pivotally rotating the respective pairs of lever arms to engage said electrodes with said rail section to vertically clamp said rail section between them; said means for causing current flow between said electrodes comprising rectifier means and three monophase transformers having separate cores and two secondary windings coupled with said rectifier means to provide a six-phase rectifying of the welding current, whereby the welding current never goes to zero and voltage peaks induced by large current fluctuations are avoided, thereby providing a smoother flash operation in forming a weld.

2. The welding apparatus of claim 1, further including phase control means; thyristors in delta-connection; said transformers being energized at the star point of the primaries thereof by said thyristors; the voltage levels for preheating, flashing, butting and postheating being induced at the gate electrodes of said phase control means.

3. The welding apparatus of claim 2, further comprising a carriage frame for supporting the vertical and horizontal clamping assemblies for one of said rail sections, and a main frame for supporting the vertical and horizontal clamping assemblies for the other one of said rail sections and for supporting therein said carriage frame for reciprocal longitudinal movement thereof with respect to said main frame; hydraulic cylinder means for reciprocally moving said carriage frame; a continuously operating advance control valve for supplying a hydraulic fluid to said hydraulic cylinder means to advance and retract said carriage frame in reciprocal fashion; and control means for operating said control valve to advance and retract said carriage frame as a function of the welding current.

4. The welding apparatus of claim 3 wherein said control means comprises means for sensing and measuring the welding current; a comparator; means for converting and coupling control signals to said comparator in accordance with the measured welding current; generator means for providing signals for continuous flashing coupled to and providing said signals to said comparator; said comparator determining the difference in said signal and said control signals and providing a difference signal to said control valve to control its operation.

5. The welding apparatus of claim 4, wherein said control means comprises means for sensing and measuring the welding current; a comparator; means for converting and coupling control signals to said comparator in accordance with the measured welding current; generator means for providing signals for pulsed flashing coupled to and providing said signals to said comparator; said comparator determining the difference in said signals and said control signals and providing a difference signal to said control valve to control its operation, and switch means for connecting one or the other of said generator means to said comparator.

6. The welding apparatus of claim 3, wherein said control means comprises means for sensing and measuring the welding current; a comparator; means for converting and coupling control signals to said comparator in accordance with the measured welding current; generator means for providing signals for pulsed flashing coupled to and providing said signals to said comparator; said comparator determining the difference in said signals and said control signals and providing a difference signal to said control valve to control its operation.

* * * * *